US008373695B2

(12) United States Patent
Kawagoshi et al.

(10) Patent No.: US 8,373,695 B2
(45) Date of Patent: Feb. 12, 2013

(54) APPARATUS AND METHOD FOR DRIVING DISPLAY PANEL INCLUDING CONTROL OF CHARGE PUMP

(75) Inventors: Hirokazu Kawagoshi, Shiga (JP); Nobuyasu Doi, Shiga (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 731 days.

(21) Appl. No.: 11/987,997

(22) Filed: Dec. 6, 2007

(65) Prior Publication Data

US 2008/0136805 A1 Jun. 12, 2008

(30) Foreign Application Priority Data

Dec. 8, 2006 (JP) ................................ 2006-331972

(51) Int. Cl.
*G06F 3/038* (2006.01)

(52) U.S. Cl. ....................................................... 345/212

(58) Field of Classification Search .................. 345/212, 345/211

See application file for complete search history.

(56) References Cited

U.S. PATENT DOCUMENTS 6,304,256 B1 * 10/2001 Nagaya ......................... 345/211
6,369,809 B1 * 4/2002 Shimoda et al. .............. 345/211
6,459,330 B2 * 10/2002 Yasue ............................ 345/212
6,633,287 B1 * 10/2003 Yatabe et al. ................. 345/211
6,734,655 B1 * 5/2004 Javanifard et al. ............ 323/222
7,129,939 B2 * 10/2006 Toyozawa et al. ............ 345/211
7,196,701 B2 * 3/2007 Tsutsui et al. ................ 345/211
7,551,171 B2 * 6/2009 Kimura et al. ................ 345/211
7,847,488 B2 * 12/2010 Kojima ......................... 315/291
2003/0080955 A1 * 5/2003 Pulvirenti et al. ............ 345/212
2003/0137481 A1 * 7/2003 Nishida ......................... 345/100
2005/0189984 A1 * 9/2005 Kawagoshi ................... 327/538
2006/0082351 A1 * 4/2006 Martins et al. ................ 323/268
2007/0040827 A1 * 2/2007 Toyozawa et al. ............ 345/211
2009/0091308 A1 * 4/2009 Omi ............................. 323/282
2009/0200956 A1 * 8/2009 Kojima ......................... 327/536

FOREIGN PATENT DOCUMENTS

JP 5-35211 2/1993
JP 2000-166220 A 6/2000
JP 2005-20971 A 1/2005

(Continued)

OTHER PUBLICATIONS

Chinese Office Action dated Jan. 30, 2011, with English translation.

(Continued)

*Primary Examiner* — Adam J Snyder

(74) *Attorney, Agent, or Firm* — McGinn IP Law Group, PLLC

(57) ABSTRACT

A display panel drive apparatus is provided with: a drive circuit outputting drive voltages to a display panel in response to a timing control signal used for timing control of image display on the display panel; and a booster circuit feeding a boosted power supply voltage to the drive circuit. The booster circuit includes a charge pump circuit generating the boosted power supply voltage by boosting an input power supply voltage in response to a boosting clock; and a pulse skip circuit monitoring a voltage level of the boosted power supply voltage and controlling an boosting operation of the charge pump circuit in response to the voltage level of the boosted power supply voltage. The pulse skip circuit is configured to allow the charge pump circuit to initiate the boosting operation in synchronization with the timing control signal.

29 Claims, 10 Drawing Sheets

FOREIGN PATENT DOCUMENTS

| | | | | |
|---|---|---|---|---|
| JP | 2005020971 | A | * | 1/2005 |
| JP | 2005-278383 | | | 10/2005 |
| JP | 2006-53349 | A | | 2/2006 |
| WO | WO 2006120842 | A1 | * | 11/2006 |

OTHER PUBLICATIONS

Japanese Office Action dated Jan. 4, 2012, with partial English translation.

* cited by examiner

APPARATUS AND METHOD FOR DRIVING DISPLAY PANEL INCLUDING CONTROL OF CHARGE PUMP

BACKGROUND OF THE INVENTION

1. Field of the Invention

The present invention relates to apparatus and method for driving a display panel, more particularly, to control of a charge pump circuit integrated within a display panel driver. This application claims the benefit of priority based on Japanese Patent Application No. 2006-331972, filed on Dec. 8, 2006, the disclosure of which is incorporated herein by reference.

2. Description of Related Art

LCD (liquid crystal display) panel drivers for cell phones often integrate a charge pump circuit that generates a boosted power supply voltage used for driving a LCD panel. One commonly-used method of controlling a charge pump circuit is pulse skipping which involves enabling and disenabling of a boosting clock supplied to the charge pump circuit in response to the boosted power supply voltage generated. The pulse skipping technique, however, may undesirably cause the generation of ripple on the outputs of the source driver.

In detail, a charge pump circuit adapted to pulse skipping undesirably suffers from more ripple as the increase in the input power supply voltage. The ripple generated by the charge pump circuit undesirably results in ripple on the outputs of the source drive circuit, because of the electromagnetic coupling within power supply lines and input circuits of the source drive circuit. The ripple on the outputs of the source drive circuit undesirably causes display noise observed as horizontal stripes. There is a need for avoiding such display noise.

In the following, an exemplary configuration of the charge pump circuit and the ripple generation therein are discussed in detail.

FIG. 1 shows a circuit diagram illustrating an exemplary configuration of an LCD panel driver incorporating a charge pump booster circuit adapted to pulse skipping. The LCD panel driver includes a booster circuit 8 and a source drive circuit 30. The booster circuit 8 boosts an input power supply voltage VDC supplied thereto to generate a boosted power supply voltage VDC2. The boosted power supply voltage VDC2 is supplied to the source drive circuit 30. As disclosed in Japanese Laid-Open Patent Application No. 2005-278383, the booster circuit 8 typically includes a charge pump circuit 10, voltage dividing resistors R1 and R2, a smoothing capacitor C3, a comparator CMP1, a level shift circuit 14, a NAND circuit 12, and a NOT circuit 11.

The charge pump circuit 10 is provided with a NMOS transistor T11, PMOS transistors T12 to T14 and a boost capacitor C1, so as to achieve voltage doubling through charge pumping. The NMOS transistor T11 has a source earth-grounded and a drain connected to the drain of the transistor T12 and also to one electrode of the boost capacitor C1. The PMOS transistor T12 has a source receiving the power supply voltage VDC. The other electrode of the booster circuit C1 is connected to the drain of the PMOS transistor T13, and also connected to the output of the charge pump circuit 10, on which a boosted power supply voltage VDC2 is generated, through the PMOS transistor T14. The PMOS transistor T13 has a source receiving the power supply voltage VDC. The gates of the transistors T11, T12 and T14 are connected to the output of the NAND circuit 12 and driven by the NAND circuit 12. The output of the NAND circuit 12 is further connected to the gate of the PMOS transistor T13 through the NOT circuit 11.

The smoothing circuit C3 smoothes the boosted power supply voltage VDC2 generated on the output of the charge pump circuit 10. The voltage dividing resistors R1 and R2 are connected in parallel to the smoothing capacitor C3 to generate an output monitor voltage mo through voltage division of the smoothed boosted power supply voltage VDC2. The output monitor voltage mo is fed to the comparator CMP1. The comparator CMP1 compares the output monitor voltage mo with a reference voltage REF1 generated by a BGR (band gap reference) circuit, and outputs an output signal ps in accordance with the comparison result. The output signal ps is set to "L", when the output monitor voltage mo exceeds the reference voltage REF1; otherwise the output signal ps is set to "H". The output signal ps is fed to the NAND circuit 12 through the level shift circuit 14 which provides level conversion. The boosted power supply voltage VDC2 can be set to a desired voltage level by adjusting the resistance ratio of the resistors R1 and R2.

The NAND circuit 12 provides the NAND of the comparison result and a boosting clock CLK for the gates of the transistors T11, T12 and T14; the output signal of the NAND circuit 12 is denoted by the symbol "gc" in FIG. 1. When the comparator CMP1 sets the output signal ps to "L" in response to the output monitor voltage mo exceeding the reference voltage REF1, the boosting clock CLK stops being supplied to the charge pump circuit 10, which results in suspending the charge and discharge of the smoothing capacitor C3. When the comparator CMP1 sets the output signal ps to "H" in response to the output monitor voltage mo being equal to or less than the reference voltage REF1, on the other hand, the boosting clock is supplied to the charge pump circuit 10 to allow the charge and discharge of the smoothing capacitor C3.

The boosted power supply voltage VDC2 is fed to the level shift circuit 14, the NOT circuit 11, and the NAND circuit 12 in addition to the source drive circuit 30, while the charge pump circuit 10 and comparator CMP1 operates on the input power supply voltage VDC.

As disclosed in Japanese Laid-Open Patent Application No. JP-A Heisei 5-35211, the source drive circuit 30 is typically provided with a gamma resistor 32, decoder circuits 33 (one shown), source amplifiers 35 (one shown), and switches 37 and 38 (one shown for each). The gamma resistor 32 generates a set of gamma-corrected grayscale voltages. The decoder circuits 33 each select one of the grayscale voltages as indicated by display data. The source amplifiers 35, each comprised of a voltage follower, provide current amplification for the grayscale voltages outputted from the respective decoder circuits 33 to generate drive voltages corresponding to the selected grayscale voltages. The drive voltages are fed to the LCD panel from the source outputs SOUT to drive liquid crystal elements CL (one shown) within selected pixels of the LCD panel. The decoder circuits 33 and the source amplifiers 35 operate on the boosted power supply voltage VDC2 received from the booster circuit 8.

The switches 37 are used to provide electrical connections between the source amplifiers 35 and the source outputs SOUT of the source drive circuit 30, and the switches 38 are used to provide electrical connections between the decoder circuits 33 and the source outputs SOUT.

The source amplifiers 35 and the switches 37 and 38 are controlled by a set of control signals SCA, SCB and SCC which are used for timing control of the image display on the liquid crystal display panel. The control signals SCA, SCB and SCC are allowed to be exclusively set to "H"; any two of control signals SCA, SCB and SCC are not allowed to be set to "H" at the same time.

When the control signal SCA is set to "H" with the control signals SCB and SCC set to "L", the switches 37 are turned on and the source amplifiers 35 are activated, while the switches 38 are turned off. This allows the source amplifiers 35 to drive the liquid crystal elements CL within the selected pixels. This operation may be refereed to as "source amplifier drive", hereinafter. Additionally, the period during which the source drive circuit 30 implements the "source amplifier drive" may be referred to as the "source amplifier drive period".

When the control signal SCB is set to "H" with the control signals SCA and SCC set to "L", the switches 38 are turned on, while the source amplifiers 35 are deactivated with the switches 37 turned off. The switches 38 provide direct electrical connections between the source outputs SOUT and the outputs of the decoder circuits 33, and this allows the decoder circuits 33 to directly drive the pixels CL. Although having substantially no drive ability, the decoder circuits 33 are designed to provide electrical connections between the source outputs SOUT and the gamma resistor 32 and to thereby maintain the voltage levels of the drive voltages on the source outputs SOUT. Such operation may be referred to as the "gamma resistor direct drive". Additionally, the period during which the source drive circuit 30 implements the "gamma resistor direct drive" may be referred to as the "gamma resistor direct drive period". The gamma resistor direct drive effectively reduces the power consumption of the source amplifiers 35.

When the control signal SCC is set to "H" with the control signals SCA and SCB set to "L", the switches 37 and 38 are turned off and the source amplifiers 35 are deactivated. In this operation, the source outputs SOUT of the source drive circuit 30 are set to high-impedance. The period during which the source drive circuit 30 sets the source outputs SOUT to high-impedance may be referred to as the "high-impedance period", hereinafter.

Although the switches 37 are shown in FIG. 1 as being provided separately from the source amplifiers 35, the source amplifiers 35 themselves may incorporate the function of the switches 37.

An exemplary operation of the LCD panel driver of FIG. 1 will be explained below with reference to FIG. 2. In FIG. 2, the top three waveforms denoted by the symbols (a), (b) and (c) are the waveforms of the control signals SCA, SCB and SCC. When the control signal SCA is set to "H", the source drive circuit 30 implements the "source amplifier drive", allowing the source amplifiers 35 to drive the liquid crystal elements CL within the selected pixels on the LCD panel.

This is followed by setting the control signal SCB to "H" and setting the control signal SCA to "L". When the control signal SCB is set to "H", the source drive circuit 30 implements the "gamma resistor direct drive", allowing the decoder circuit 33 to be directly connected to the liquid crystal elements CL within the selected pixels.

Subsequently, the control signal SCC is set to "H" and the control signal SCB is set to "L". When the control signal SCC is set to "H", the source outputs SOUT of the source drive circuit 30 are set to high-impedance. It should be noted that the cycles of the control signals SCA, SCB and SCC may differ depending on the configuration of the liquid crystal display panel.

The boosting clock CLK supplied to the booster circuit 8 does not need to be synchronized with the control signals SCA, SCB and SCC. In the operation shown in FIG. 2, the boosting clock CLK is generated so that the cycle of the boosting clock CLK is longer than the cycles of the control signals SCA, SCB and SCC as shown in FIG. 2(*e*).

The output signal ps of the comparator CMP1, as shown in FIG. 2(*d*), indicates the comparison result of the output monitor voltage mo (indicated as the solid line of FIG. 2(*g*)) and the reference voltage REF1 (indicated as the broken line of FIG. 2(*g*)). The output signal ps is set to "L" when the output monitor voltage mo exceeds the reference voltage REF1, and set to "H" otherwise. The comparator CMP1 is designed to have different delays in switching the output signal ps from "L" to "H" and in switching the output signal ps from "H" to "L"; the duration of time to set the output signal ps to "H" after the output monitor voltage mo exceeds the reference voltage REF1 is different from that to set the output signal ps to "L" after the output monitor voltage mo is reduced below the reference voltage REF1. This implies that the comparator CMP1 exhibits hysteresis characteristics.

As shown in FIG. 2(*f*), the NAND circuit 12 sets the output signal gc thereof to "L", when the output monitor voltage mo is equal to or less than the reference voltage REF1 with the boosting clock CLK pulled up to "H". In response to the output signal gc being set to "L", electric charges charged across the boost capacitor C1 are transferred through the transistor T14 to the source drive circuit 30 and other circuits (including the NOT circuit 11, the NAND circuit 12, and the level shift circuit 14), to thereby charge the smoothing capacitor C3. When the boosted power supply voltage VDC2 is increased and the output monitor voltage mo exceeds the reference voltage REF1, the output signal ps of the comparator CMP1 is set to "L" as shown in FIG. 2(*d*), to fix the output signal gc of the NAND circuit 12 to "H". In response to the output signal gc being set to "H", the transistor T14 is turned off. In this state, the voltage level of the boosted power supply voltage VDC2 is maintained by the smoothing capacitor C3, allowing the boosted power supply voltage VDC2 to be gradually decreased. As shown in FIG. 2(*g*), when the power consumption of circuits operating on the boosted power supply voltage VDC2 (including the source drive circuit 30) is large enough to reduce the output monitor voltage mo down to or less than the reference voltage REF1 while the boosting clock signal CLK maintains at "H", the output signal ps of the comparator CMP1 is set to "H" as shown in FIG. 2(*d*). In response to the output signal ps being set to "H", the output signal gc of the NAND circuit 12 is set to "L" to allow charging the smoothing capacitor C3 as shown in FIG. 2(*f*).

In such operation, the boosted power supply voltage VDC2 varies irregularly in accordance with current consumption of the circuits operating on the boosted power supply voltage VDC2, including the source drive circuit 30. Larger current consumption causes the output monitor voltage mo to be reduced down to or less the reference voltage REF1 in a shorter time of period. Moreover, the duration of time required for the output monitor voltage mo to exceed the reference voltage REF1 in charging the smoothing capacitor C3 is longer, when the boosted power supply voltage VDC2 is low at the start of charging the smoothing capacitor C3. The boosted power supply voltage VDC2 is thus prevented from being excessively increased, and the smoothing capacitor C3 is charged when the boosted power supply voltage VDC2 is reduced. That is, the booster circuit 8 performs charge and discharge operations irregularly in accordance with the current consumption of the source drive circuit 30 and other circuits operating on the boosted power supply voltage VDC2.

When the booster circuit 8 repeatedly performs charge and discharge operations, the boosted power supply voltage VDC2 undesirably suffers from ripple resulting from the turn-on-and-off of the transistor 14. The ripple on the boosted power supply voltage VDC2 causes noise on the drive voltages outputted from the source drive circuit 30 through the decoder circuit 33 and the source amplifiers 35. In detail, when the control signal SCA is set to "H" to implement the "source amplifier drive" (see FIG. 2(*a*)) or when the control signal SCB is set to "H" to implement the "gamma resistor direct drive" (see FIG. 2(*b*)), the ripple of the boosted power supply voltage VDC2 causes noise observed as horizontal stripes on the LCD panel. The ripple causes significant influence on the displayed image especially in the last portion of the "source amplifier drive period", and in the "gamma resister direct drive period", because the currents fed to the selected pixels are reduced after the completion of charging and discharging the liquid crystal elements CL of the selected pixels. Furthermore, the amplitude of ripple generated by the charge pump circuit adapted to pulse skipping is increased substantially in proportion to the voltage level of the input power supply voltage. Accordingly, the ripple of the boosted power supply voltage VDC2 causes significant influences on the display image when the power supply voltage VDC fed to the charge pump circuit 10 is increased.

As thus described, a charge pump circuit adapted to pulse skipping may suffer from the deterioration of the display image quality caused by noise on the outputs of source drive circuit resulting from the operation of the charge pump circuit.

SUMMARY

In one embodiment, a display panel drive apparatus is provided with: a drive circuit outputting drive voltages to a display panel in response to a timing control signal used for timing control of image display on the display panel; and a booster circuit feeding a boosted power supply voltage to the drive circuit. The booster circuit includes a charge pump circuit generating the boosted power supply voltage by boosting an input power supply voltage in response to a boosting clock; and a pulse skip circuit monitoring a voltage level of the boosted power supply voltage and controlling an boosting operation of the charge pump circuit in response to the voltage level of the boosted power supply voltage. The pulse skip circuit is configured to allow the charge pump circuit to initiate the boosting operation in synchronization with the timing control signal.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

Figure 1:
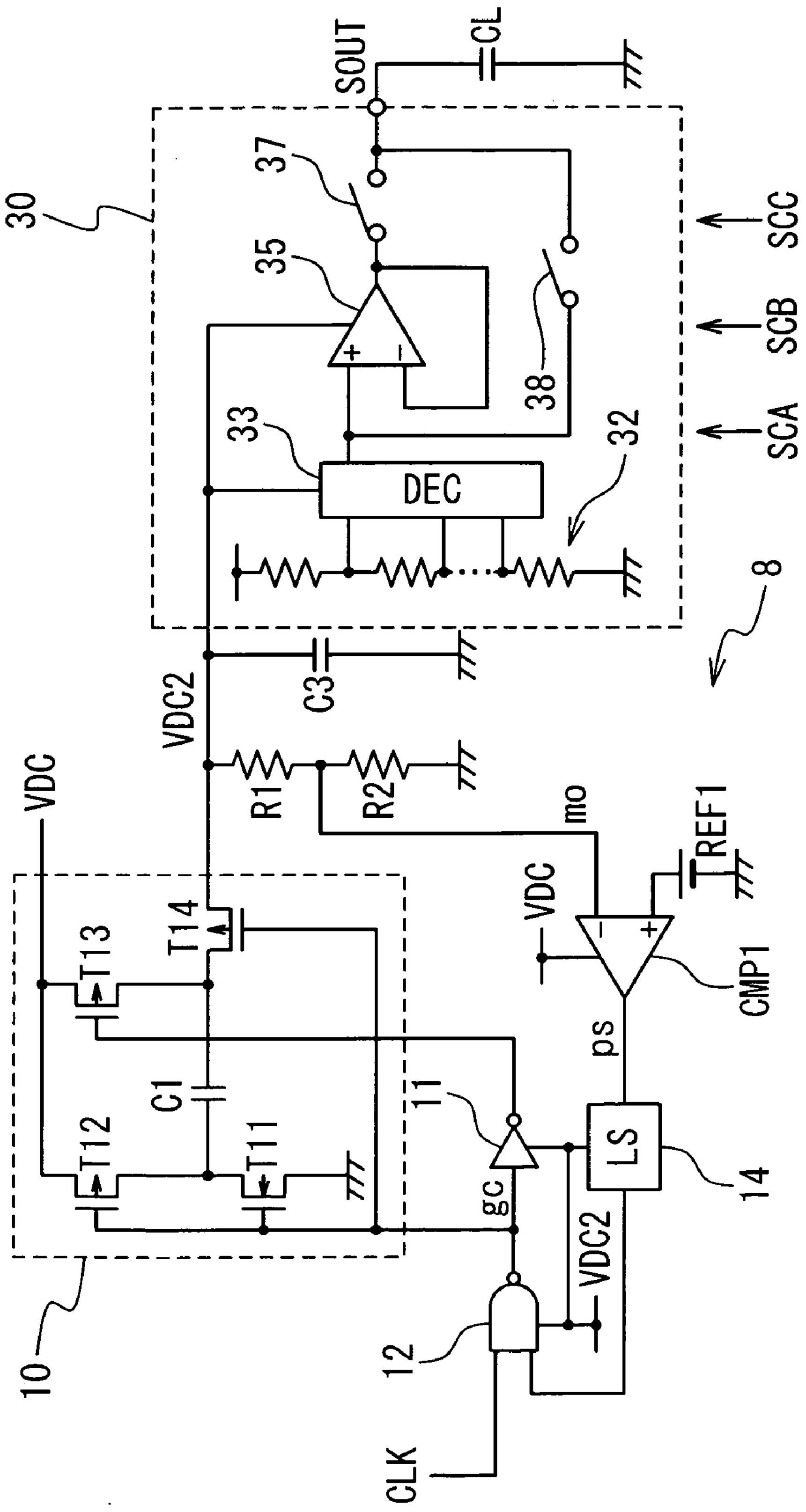
Fig. 1 PRIOR ART
FIG. 1 is a circuit diagram illustrating the configuration of a conventional LCD panel driver.
Figure 2:
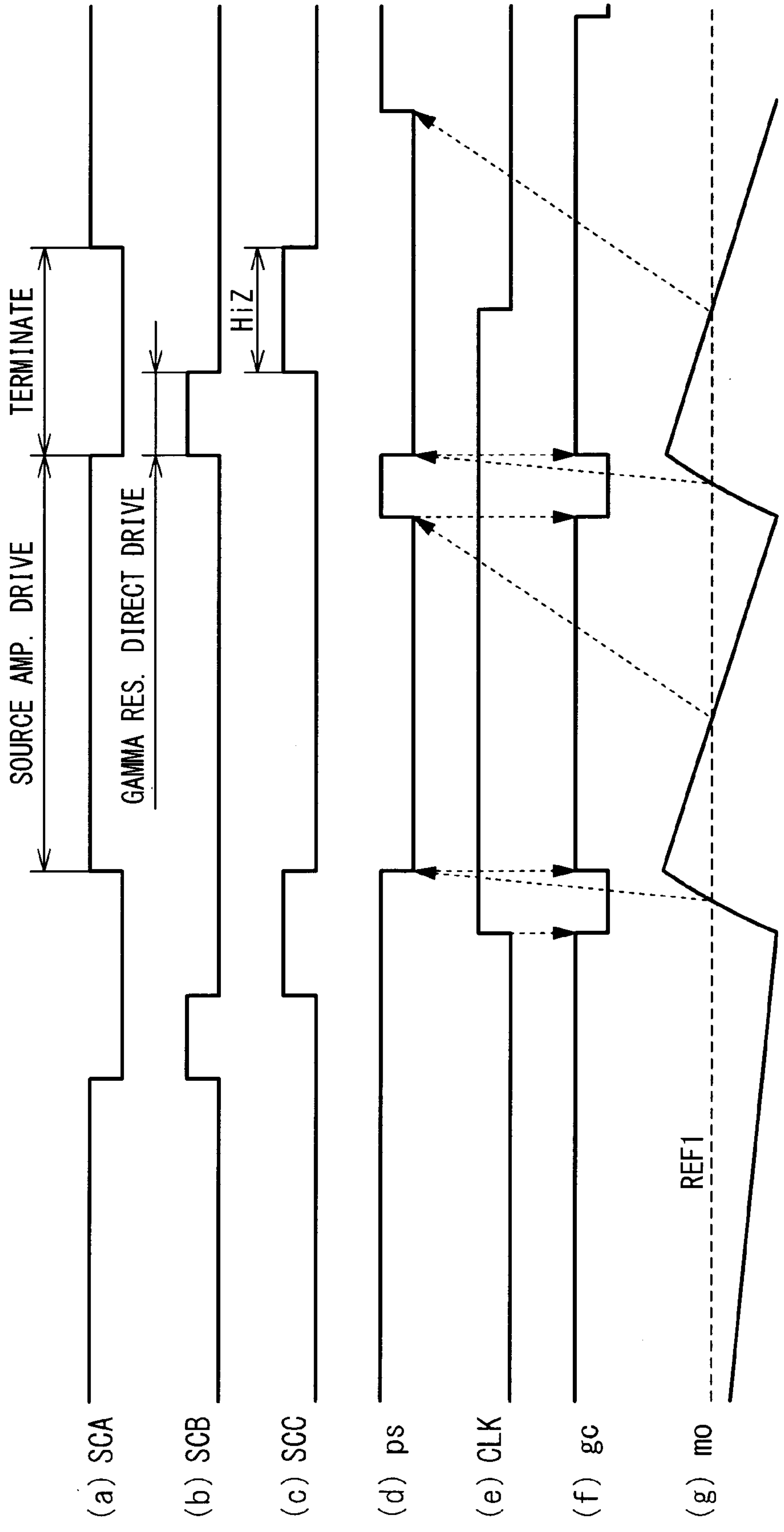
Fig. 2 PRIOR ART
FIG. 2 is a timing chart illustrating the operation of the conventional LCD panel driver shown in FIG. 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes. It should be noted that same numerals denote same elements in the drawings.

Figure 3:
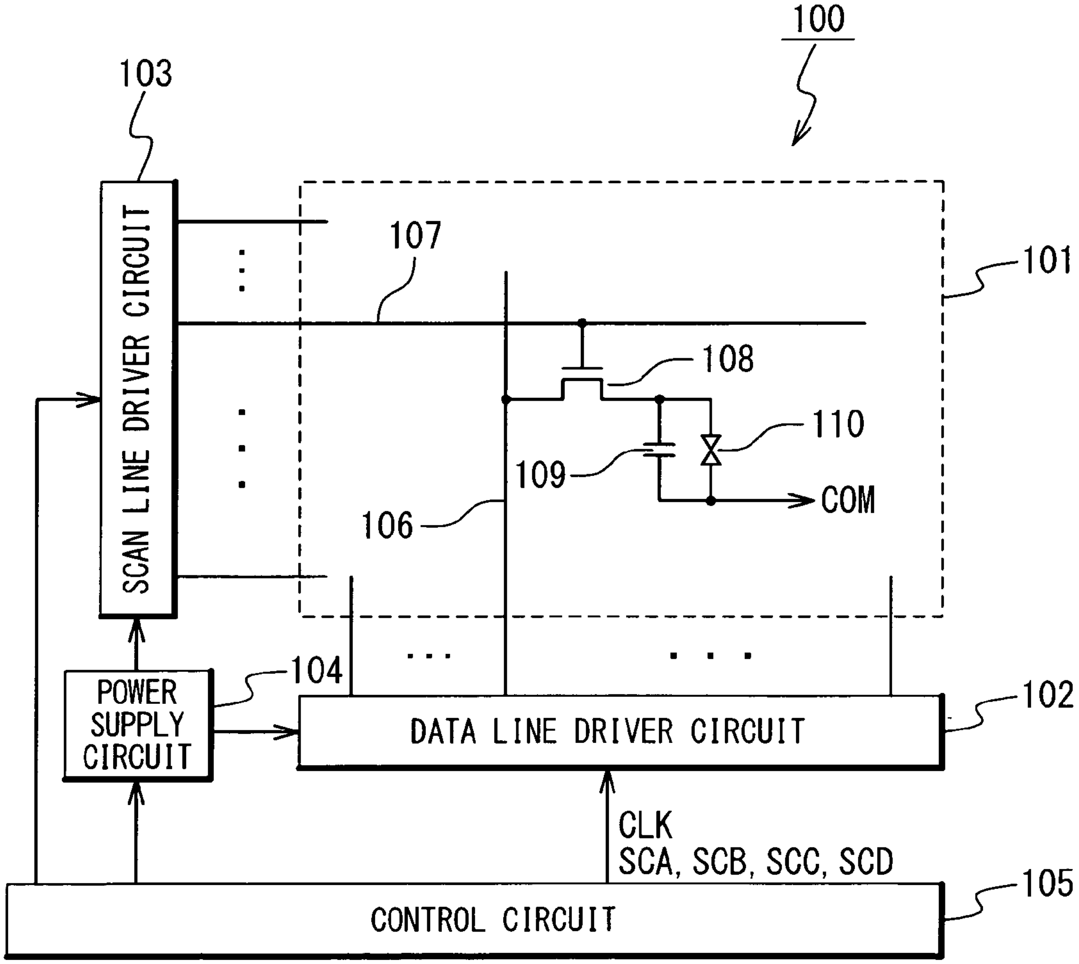
FIG. 3 is a block diagram illustrating an exemplary configuration of an LCD display device in a first embodiment of the present invention.

FIG. 3 is a block diagram showing a configuration of an LCD device in one embodiment of the present invention. An LCD device 100 includes an LCD panel 101, a data line driver circuit 102, a scan line driver circuit 103, a power supply circuit 104, and a control circuit 105.

The LCD panel 101 is provided with data lines 106 extending in the vertical direction, and scan lines 107 extending in the horizontal direction. For monochrome display, pixels are provided at respective intersections of the data lines 106 and the scan lines 107, each pixel including a TFT (thin film transistor) 108, a pixel capacitor 109, and a liquid crystal element 110 as shown in FIG. 3. The TFT 108 has a gate connected to the scan line 107 and a source (or drain) connected to the data line 106. The drain (or source) of the TFT 108 is connected to the pixel capacitor 109 and the liquid crystal element 110, and the pixel capacitor 109 and the liquid crystal element 110 are commonly connected to a common electrode COM. The liquid crystal element 110 functions as a capacitive element.

For multicolor display, each pixel is provided with sub-pixels corresponding to different colors (typically, red (R), green (G) and blue (B)), each sub-pixel including a TFT 108, a pixel capacitor 109 and a liquid crystal element 110. The monochrome and multicolor LCD panels are basically driven in the same way.

The data line driver circuit 102 outputs analog drive voltages in response to digital image signals (referred to as the image data, hereinafter) to drive the data lines 106. The scan line driver circuit 103 sequentially selects one of the scan lines 107, and activates the selected scan line 107 to turn on the TFTs 108 associated with the selected scan line 107. The power supply circuit 104 supplies a power supply voltage VDC to the data line driver circuit 102 and the scan line driver circuit 103. The control circuit 105 generates timing control signals for controlling operation timings of the data line driver circuit 102 the scan line driver circuit 103 in driving the data lines 106 and the scan lines 107. Timing control signals generated by the control circuit 105 include a clock signal CLK, and control signals SCA, SCB, SCC and SCD fed to the data line driver circuit 102. Details of the clock signal CLK and the timing control signals SCA, SCB, SCC and SCD will be described later.

First Embodiment

Figure 4:
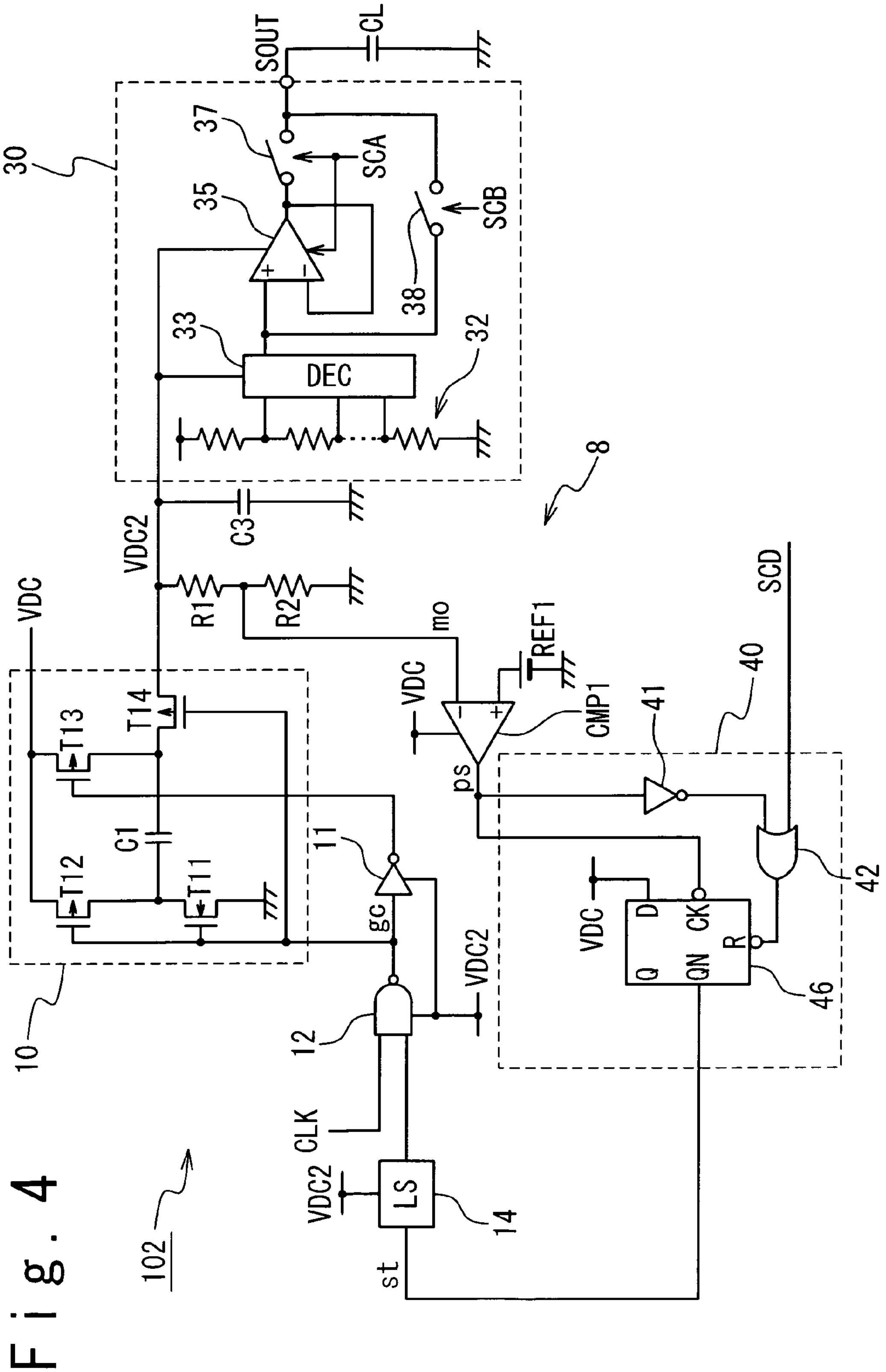
FIG. 4 is a circuit diagram illustrating an exemplary configuration of a data line driver circuit.

FIG. 4 shows a circuit diagram illustrating an exemplary configuration of the data line driver circuit 102 in a first embodiment of the present invention. The data line driver circuit 102 includes a booster circuit 8 adapted to pulse skipping, and a source drive circuit 30 which drives the data lines 106. The booster circuit 8 boosts the power supply voltage VDC supplied thereto to generate a boosted power supply voltage VDC2. The boosted power supply voltage VDC2 is supplied to the source drive circuit 30. The booster circuit 8 is provided with a charge pump circuit 10, a voltage dividing resistors R1 and R2, a smoothing capacitor C3, a comparator CMP1, a skip signal control circuit 40, a level shift circuit 14, a NAND circuit 12, and a NOT circuit 11.

The charge pump circuit 10 is provided with NMOS transistor T11, PMOS transistors T12 to T14 and a boost capacitor C1, so as to achieve voltage doubling through charge pumping. The NMOS transistor T11 has a source earth-grounded and a drain connected to the drain of the PMOS transistor T12 and to one electrode of the boost capacitor C1. The PMOS transistor T12 has a source receiving the power supply voltage VDC. The other electrode of the boost capacitor C1 is connected the drain of the PMOS transistor T13, and also connected to the output of the charge pump circuit 10 through the P-channel MOS transistor T14. The boosted power supply voltage VDC2 is generated on the output of the charge pump circuit 10. The PMOS transistor T13 has a source receiving the power supply voltage VDC. The gates of the transistors T11, T12 and T14 are connected to the output of the NAND circuit 12 and driven by the NAND circuit 12. The output of the NAND circuit 12 is further connected to the gate of the transistor T13 through the NOT circuit 11.

The boosted power supply voltage VDC2 generated on the output of the charge pump circuit 10 is smoothed by the smoothing capacitor C3. The smoothed boosted power supply voltage VDC2 is subjected to voltage division by voltage dividing resistors R1 and R2 connected in parallel to the smoothing capacitor C3, to thereby generate an output monitor voltage mo. The output monitor voltage mo is fed to the comparator CMP1. The comparator CMP1 compares the output monitor voltage mo with a reference voltage REF1 generated by a BGR (band gap reference) circuit, and generates the output signal ps indicative of the comparison result. The comparator CMP1 sets the output signal ps to "L" when the output monitor voltage mo exceeds the reference voltage REF1; otherwise the comparator CMP1 sets the output signal ps to "H". In this embodiment, the comparator CMP1 is a comparator that does not having hysteresis characteristics. The output signal ps, which indicates the comparison result by the comparator CMP1, is fed to the skip signal control circuit 40. In an alternative embodiment, the comparator CMP1 may be a comparator having the hysteresis characteristics as discussed in the description of the related art.

The skip signal control circuit 40 includes a flip-flop 46, a NOT circuit 41, and an OR circuit 42. The flip-flop 46 receives the output signal ps from the comparator CMP1 on the clock input CK, and receives the power supply voltage VDC on the data input D. The flip-flop 46 is negative-edge triggered by the output signal ps to be set; the flip-flop 46 sets the data output Q to "H" and the negative data output QN to "L", in response to the pull-down of the output signal ps. The output signal ps of the comparator CMP1 is also fed to the OR circuit 42 through the NOT circuit 41. The OR circuit 42 outputs the OR of the output signal of the NOT circuit 41 and the control signal SCD, to the active-low reset input R of the flip-flop 46. The flip-flop 46 is responsive to the pull-down of the signal fed to the active-low reset input R for resetting the state thereof, that is, for setting the data output Q to "L" and setting the negative data output QN to "H". Accordingly, the skip signal control circuit 40 sets the output signal st to "H" from the negative data output QN of the flip-flop 46 during the period from the timing of the pull-down of the control signal SCD to the timing of the pull-down of the output signal ps of the comparator CMP1.

The output signal st of the skip signal control circuit 40 is subjected to level conversion by the level shift circuit 14, and then fed to the NAND circuit 12. The NAND circuit 12 generates an output signal gc indicating the NAND of the output signal st of the skip signal control circuit 40 and the boosting clock CLK. The NAND circuit 12 feeds the output signal gc to the gates of the transistors T11, T12 and T14. In other words, the NAND circuit 12 provides gating of the boosting clock CLK. The supply of the boosting clock CLK to the charge pump circuit 10 is prohibited, when the output signal st of the skip signal control circuit 40 is set to "L". In this case, the smoothing capacitor C3 is gradually discharged in maintaining the voltage level of the boosted power supply voltage VDC2 fed to the source driver circuits 30. When the output signal st of the skip signal control circuit 40 is set to "H", on the other hand, the boosting clock CLK is fed to the charge pump circuit 10 with the phase thereof inverted, allowing the charge pump circuit 10 to charge the smoothing capacitor C3; the charge pump circuit 10 feeds electric power to the source drive circuit 30.

The level shift circuit 14, the NOT circuit 11, the NAND circuit 12, and the source drive circuit 30 are operated on the boosted power supply voltage VDC2 of the booster circuit 8. The charge pump circuit 10, the comparator CMP1, and the skip signal control circuit 40 are operated on the power supply voltage VDC.

The source drive circuit 30 is provided with a gamma resistor 32, decoder circuits 33 (one shown), source amplifiers 35 (one shown), and switches 37 and 38 (each one shown). The gamma resistor 32 generates a set of gamma-corrected grayscale voltages. The decoder circuits 33 each select one of the grayscale voltages as indicated by display data. The source amplifiers 35, each comprised of a voltage follower, provide current amplification for the grayscale voltages outputted from the associated decoder circuits 33 to generate drive voltages corresponding to the selected grayscale voltages. The drive voltages are fed to the LCD panel from the source outputs SOUT to drive liquid crystal elements CL (one shown) within selected pixels of the LCD panel. The decoder circuits 33 and the source amplifiers 35 operate on the boosted power supply voltage VDC2 received from the booster circuit 8.

The switches 37 are used to provide electrical connections between the source amplifiers 35 and the source outputs SOUT of the source drive circuit 30, and the switches 38 are used to provide electrical connections between the decoder circuits 33 and the source outputs SOUT.

The source amplifiers 35 and the switches 37 and 38 are controlled by a set of display drive control signals SCA, SCB and SCC which are used to control operation timings in driving the liquid crystal display panel. The control signals SCA, SCB and SCC are generated to be exclusively set to "H"; any two of control signals SCA, SCB and SCC are not allowed to be set to "H" at the same time.

When the control signal SCA is set to "H" with the control signals SCB and SCC set to "L", the switches 37 are turned on and the source amplifiers 35 are activated, while the switches 38 are turned off. This allows the source drive circuit 30 to implement the "source amplifier drive", allowing the source amplifiers 35 to drive the liquid crystal elements CL.

When the control signal SCB is set to "H" with the control signals SCA and SCC set to "L", the switches 38 are turned on, while the source amplifiers 35 are deactivated with the switches 37 turned off. In this case, the source drive circuit 30 implements the "gamma resistor direct drive", allowing the decoder circuits 33 to directly drive the pixels CL through the switches 38. Although having substantially no drive ability, the decoder circuits 33 provide electrical connections between the source outputs SOUT and the gamma resistor 32 and to thereby maintain the voltage levels of the drive voltages on the source outputs SOUT.

When the control signal SCC is set to "H" with the control signals SCA and SCB set to "L", the switches 37 and 38 are turned off and the source amplifiers 35 are deactivated. In this case, the source outputs SOUT of the source drive circuit 30 are set to high-impedance.

Although the switches 37 are provided separately from the source amplifiers 35 in the LCD panel driver of FIG. 1, the source amplifiers 35 themselves may incorporate the function of the switches 37.

Figure 5:
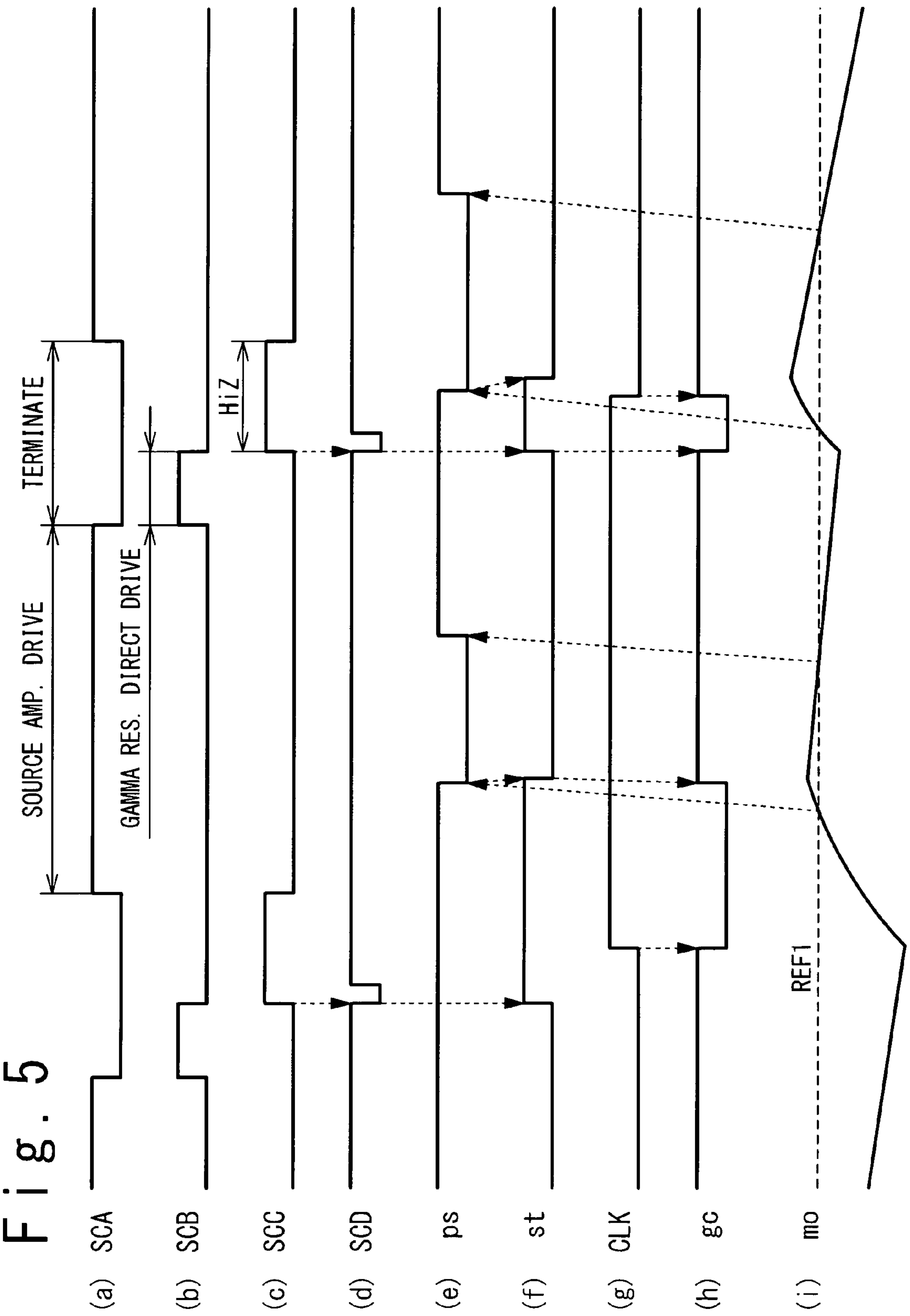
FIG. 5 is a timing chart illustrating an exemplary operation of the data line driver circuit in the first embodiment.

An exemplary operation of the LCD panel driver of the first embodiment will be explained below with reference to FIG. 5. In FIG. 5, the top three waveforms denoted by the symbols (a), (b) and (c) are the waveforms of the control signals SCA, SCB and SCC. When the control signal SCA is set to "H", the source drive circuit 30 implements the "source amplifier drive", allowing the source amplifiers 35 to drive the liquid crystal elements CL within the selected pixels on the LCD panel.

This is followed by setting the control signal SCB to "H" and setting the control signal SCA to "L". When the control signal SCB is set to "H", the source drive circuit 30 implements the "gamma resistor direct drive", allowing the decoder circuit 33 to be directly connected to the liquid crystal elements CL within the selected pixels.

Subsequently, the control signal SCC is set to "H" and the control signal SCB is set to "L". When the control signal SCC is set to "H", the source drive circuit 30 is placed into the "high-impedance state", in which the source outputs SOUT of the source drive circuit 30 are set to high-impedance. It should be noted that the cycles of the control signals SCA, SCB and SCC may differ depending on the configuration of the liquid crystal display panel.

FIG. 5(*d*) shows the waveform of the control signal SCD, which is an active-low one-shot pulse signal having a predetermined pulse width. The falling edges of the control signal SCD are synchronized with the rising edges of the control signal SCC; that is, the clock signal SCD indicates the start of the "high-impedance periods", during which the source outputs SOUT of the source drive circuit 30 are set to high impedance.

In this embodiment, as shown in FIG. 5(*g*), the boosting clock CLK, which is fed to the supplied to the booster circuit 8, is generated so that the cycle of the boosting clock CLK is twice as long as the cycles of the control signals SCA, SCB, SCC and SCD; it should be noted, however, that the boosting clock CLK does not need to be synchronized with the control signals SCA, SCB, SCC and SCD. Preferably, the boosting clock CLK is generated so that one(s) of the rising and falling edges are located in the respective "high-impedance periods". It is further preferable that the boosting clock CLK is generated so that one of the rising or falling edges of the boosting clock CLK equally divides each of the "high-impedance periods" into two periods of the same duration.

When the clock signal SCD is set to "L" (see FIG. 5(*d*)) in a case in which the comparator CMP1 sets the output signal ps to "H", that is, in a case in which the output monitor voltage mo (shown as the solid line of FIG. 5(*i*)) is less than the reference voltage REF1 (shown as the broken line of FIG. 5(*i*)), the active-low reset input R of the flip-flop 46 is set to "L", and this allows the skip signal control circuit 40 to set the output signal st into "H" (see FIG. 5(*f*)).

When the output signal st of the skip signal control circuit 40 and the boosting clock CLK are both set to "H", the NAND circuit 12 sets the output signal gc to "L" as shown in FIG. 5(*h*). This results in that the transistors T11 and T12 are turned off, and the transistors T12 and T14 are turned on, allowing the voltage charged across the boost capacitor C1 to be supplied to the source drive circuit 30 and other circuits, while charging the smoothing capacitor C3. As a result, the voltage level of the boosted power supply voltage VDC2 is increased, accompanied by the increase in the output monitor voltage mo as shown in the solid line of FIG. 5(*i*). When detecting that the output monitor voltage mo exceeds the reference voltage REF1, the comparator CMP1 sets the output signal ps to "L" as shown in FIG. 5(*e*). In response to the output signal ps being set to "L", the flip-flop 46 latches the power supply voltage VDC on the data input D so as to set the negative data output QN (i.e. the output signal st) to "L" as shown in FIG. 5(*f*). In response to the output signal st being set to "L", the output signal gc of the NAND circuit 12 is set to "H" as shown in FIG. 5, allowing the transistors T11 and T13 to be turned on with the transistors T12 and T14 turned off. As a result, the output of the charge pump circuit 10 is set high-impedance, so that the booster circuit 8 supplies electric power to the source drive circuit 30 by the discharge from the smoothing capacitor C3. The discharge of the smoothing capacitor C3 causes the gradual decrease in the boosted power supply voltage VDC2. When the comparator CMP1 then detects that the output monitor voltage mo is reduced below the reference voltage REF1 as shown in FIG. 5(*i*), the comparator CMP1 sets the output signal ps to "H". It should be noted that the charge pump circuit 10 does not start the boosting operation immediately after the output signal ps is set to "H" (that is, the boosted power supply voltage VDC2 is reduced below a specific voltage determined by the reference voltage REF1 fed to the comparator CMP1), as shown in FIG. 5(*e*). The charge pump circuit 10 starts the boosting operation in response to the falling edges of the clock signal SCD only while the boosted power supply voltage VDC2 is lower than the specific voltage corresponding to the reference voltage REF1.

Figure 6:
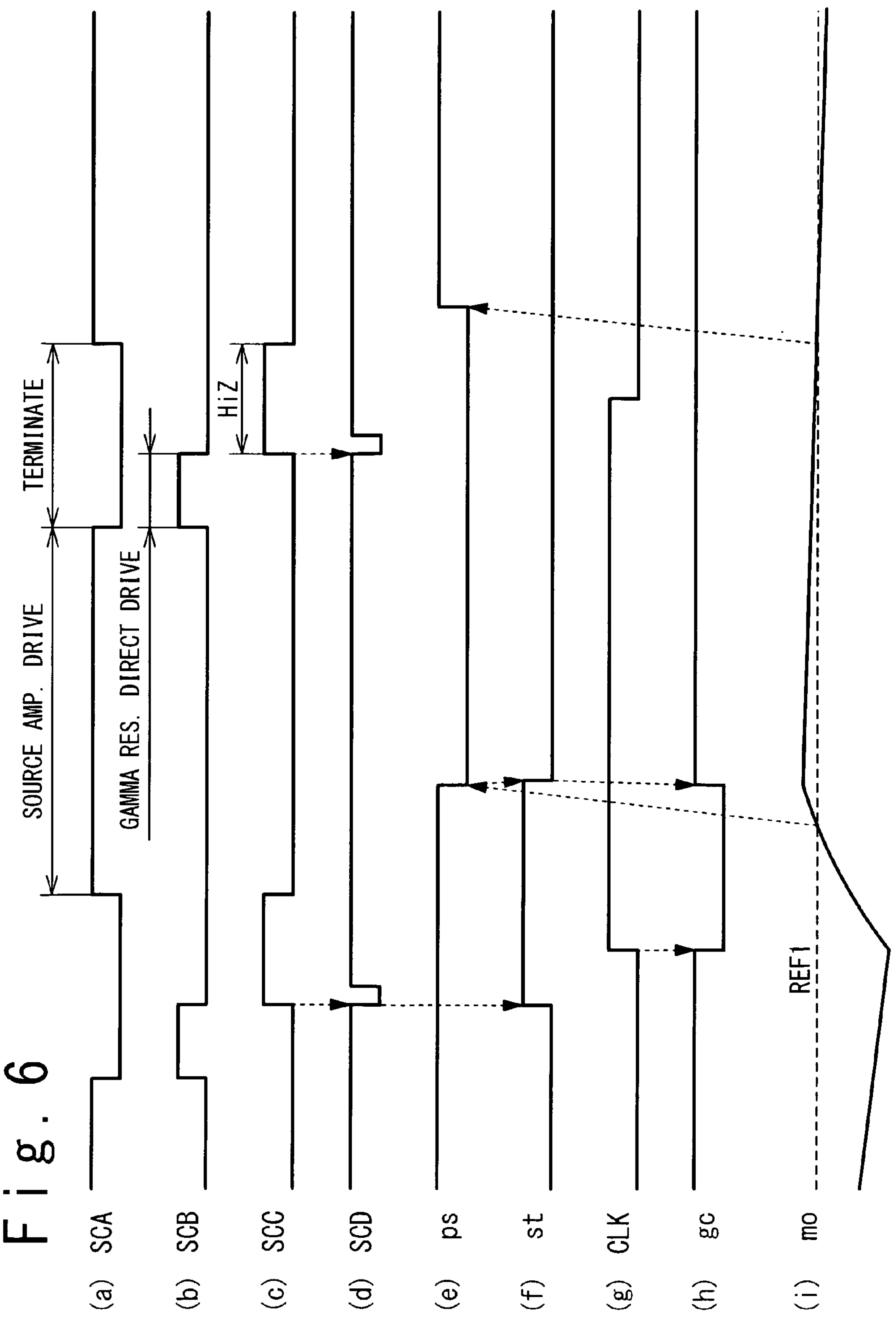
FIG. 6 is a timing chart illustrating another exemplary operation of the data line driver circuit the first embodiment.

FIG. 6 shows an exemplary operation of the booster circuit 8 when the load of the booster circuit 8 is light and therefore the discharge rate of the smoothing capacitor C3 is slow. When the clock signal SCD is pulled down to "L" with the output monitor voltage mo exceeding the reference voltage REF1 (indicated as the second "L" active-low pulse in FIG. 6(*d*)), the output of the OR circuit 42 is unchanged, because the output signal ps of the comparator CMP1 remains "L" (see FIG. 6(*e*)). This results in that the state of the flip-flop 46 is unchanged with output signal st continuously set to "L" as shown in FIG. 6(*f*). In this case, the boosting clock CLK is not supplied to the respective transistors of the charge pump circuit 10 and the charge pump circuit 10 does not perform charge and discharge operations.

As thus described, the booster circuit 8 is designed to allow the charge pump circuit 10 to start the boosting operation in response to the activation of the control signal SCD, which indicates the initiation of the "high-impedance periods". Accordingly, the charge pump circuit 10 selectively operates in the "high-impedance periods" and in the former parts of the "source amplifier drive periods"; the charge pump circuit 10 does not operate in the latter parts of the "source amplifier drive periods", and in the "gamma-resister direct drive periods". Therefore, the ripple caused by the boosting clock CLK does not deteriorate the display performance of the LCD display device. In other words, the operation described above effectively stabilizes the boosted power supply voltage VDC2 in implementing the "source amplifier drive" or "gamma-resistor direct drive", avoiding the deterioration of the display quality of the LCD display device caused by the ripple of the boosted power supply voltage VDC2 in the operation of the booster circuit 8.

Second Embodiment

Figure 7:
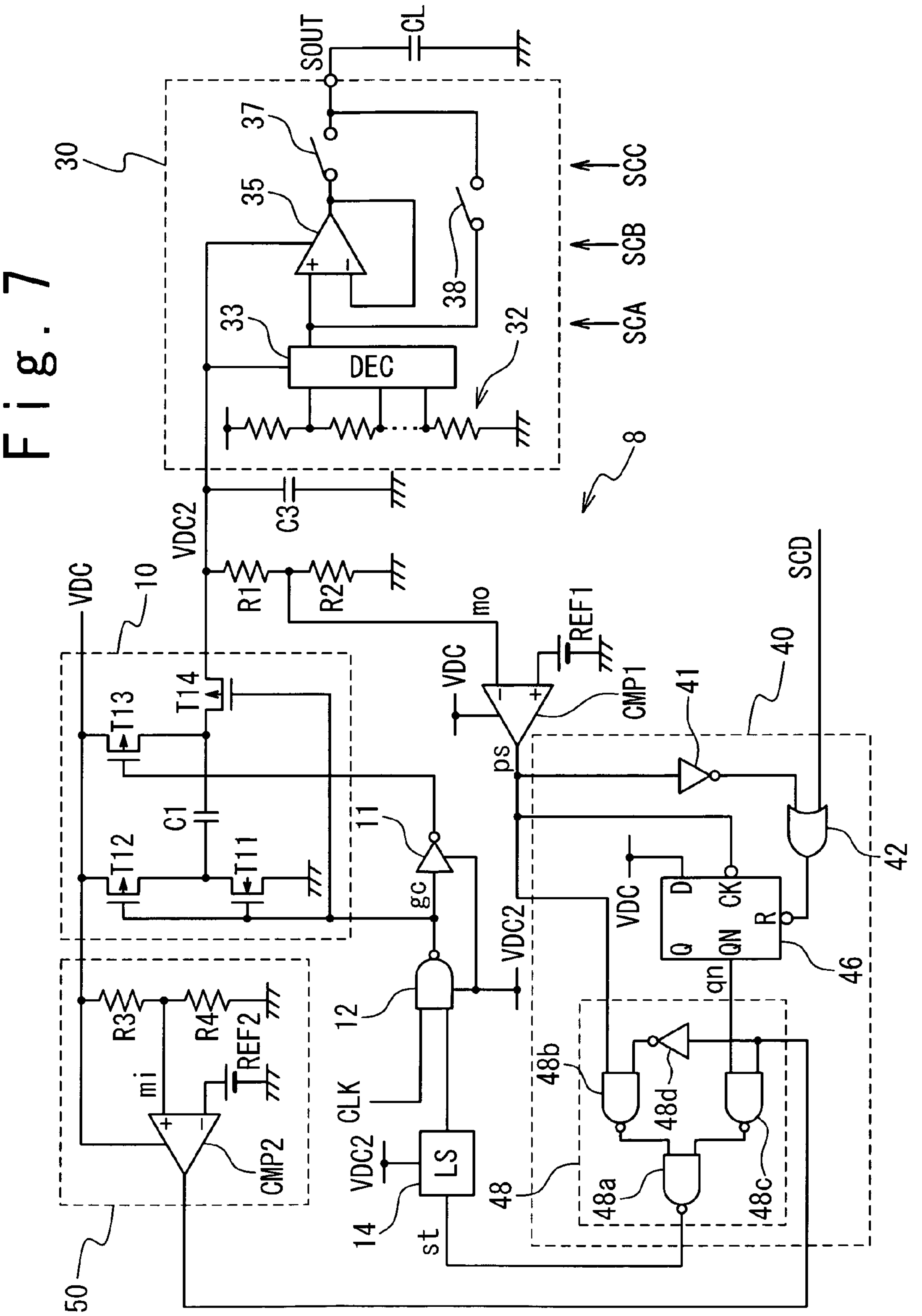
FIG. 7 is a circuit diagram illustrating an exemplary configuration of a data line driver circuit in a second embodiment of the present invention.

FIG. 7 shows an exemplary configuration of a booster circuit 8 in a second embodiment. The boosted power supply voltage VDC2, generated by the booster circuit 8, experiences ripple which increases as the increase in the voltage level of the power supply voltage VDC. In the second embodiment, the booster circuit 8 operates in response to the control signal SCD only when the voltage level of the power supply voltage VDC is increased and thereby the LCD panel tends to experience the noise observed as horizontal stripes.

In the second embodiment, a power supply voltage monitoring circuit 50 which monitors the input power supply voltage VDC is additionally provided for the data line driver circuit 102. In addition, the skip signal control circuit 40 additionally includes a selector circuit 48 which selects the output signal ps of the comparator CMP1 and the output signal qn of the flip-flop 46. In this embodiment, the selector circuit 48 is provided with NAND circuits 48*a* to 48*c* and a NOT circuit 48*d*. The remaining circuits of the second embodiment are structured identically to the corresponding circuits of the first embodiment.

The power supply voltage monitoring circuit 50, which monitors the input power supply voltage VDC, is provided with a comparator CMP2 and voltage dividing resistors R3 and R4. The voltage dividing resistors R3 and R4 generates an input monitor voltage mi through voltage division of the power supply voltage VDC. The comparator CMP2 compares the input monitor voltage mi with a reference voltage REF2 generated by a BGR (band gap reference) circuit. The comparator CMP2 outputs "H" when the input monitor voltage mi exceeds the reference voltage REF2, and outputs "L" otherwise. The output signal of the comparator CMP2 determines which is to be selected by the selector circuit 48 between the output signal ps of the comparator CMP1 and the output signal qn of the flip-flop 46.

The threshold value of the power supply voltage VDC at which the output of the comparator CMP2 is switched between "H" and "L" is adjustable by the resistance ratio of the voltage dividing resistors R3 and R4. The resistance ratio of the voltage dividing resistors R3 and R4 may be controlled by the state of the load of the booster circuit 8 and/or the state of the power supply voltage VDC; in one embodiment, the power supply voltage monitoring circuit 50 may be designed so that the resistance ratio of the voltage dividing resistors R3 and R4 is controlled by an externally-provided control signal.

The selector circuit 48 selects the output signal ps of the comparator CMP1 and the output signal qn of the flip-flop 46 in response to the output of the comparator CMP2. When the output of the comparator CMP2 is set to "H", the selector circuit 48 selects the output signal qn as the output signal st of the skip signal control circuit 48. When the output of the comparator CMP2 is set to "L", on the other hand, the selector circuit 48 selects the output signal ps as the output signal st. That is, the output signal qn of the flip-flop 46 is selected when the input power supply voltage VDC is higher than a specific voltage corresponding to the reference voltage REF2, and the output signal ps of the comparator CMP1 is selected when the input power supply voltage VDC is lower than the specific voltage. Accordingly, the control signal SCD is used as a trigger to operate the charge pump circuit 10 only when the power supply voltage VDC is higher than the specific voltage, as explained in the first embodiment. That is, the charge pump circuit 10 starts charge and discharge operations to charge the smoothing capacitor C3 in synchronization with the timings at which the source outputs SOUT of the source drive circuit 30 are set to high-impedance only when the power supply voltage VDC is higher than the specific voltage. When the input power supply voltage VDC is lower than the specific voltage, the charge pump circuit 10 performs the charge and discharge operations in response to the output signal ps of the comparator CMP1, independently of the control signal SCD.

In summary, the booster circuit 8 in the second embodiment additionally incorporates the power supply voltage monitoring circuit 50 to detect that the input power supply voltage VDC exceeds a fixed voltage, enabling the skip signal control circuit 40 only when the amplitude of the ripple on the output of the booster circuit 8 is increased with the increase in the power supply voltage VDC. Such operation effectively reduces the influence of the ripple on the source outputs SOUT of the source drive circuit 30, avoiding the deterioration of the image quality.

When the power supply voltage VDC is low, on the other hand, the booster circuit 8 operates the charge pump circuit 10 in response to the output signal ps of the comparator CMP1 (that is, the boosted power supply voltage VDC2), independently of the control signal SCD. Operating the charge pump circuit 10 in synchronization with the control signal SCD undesirably reduces the current drive ability of the booster circuit 8 when the power supply voltage VDC is low. In this embodiment, the charge pump circuit 10 is allowed to operate during the "source amplifier drive period" and the "gamma resistor direct drive period", when the output of the booster circuit 8 is almost free from the ripple with the power supply voltage VDC reduced. This effectively improves the current drive ability of the booster circuit 8.

Third Embodiment

Figure 8:
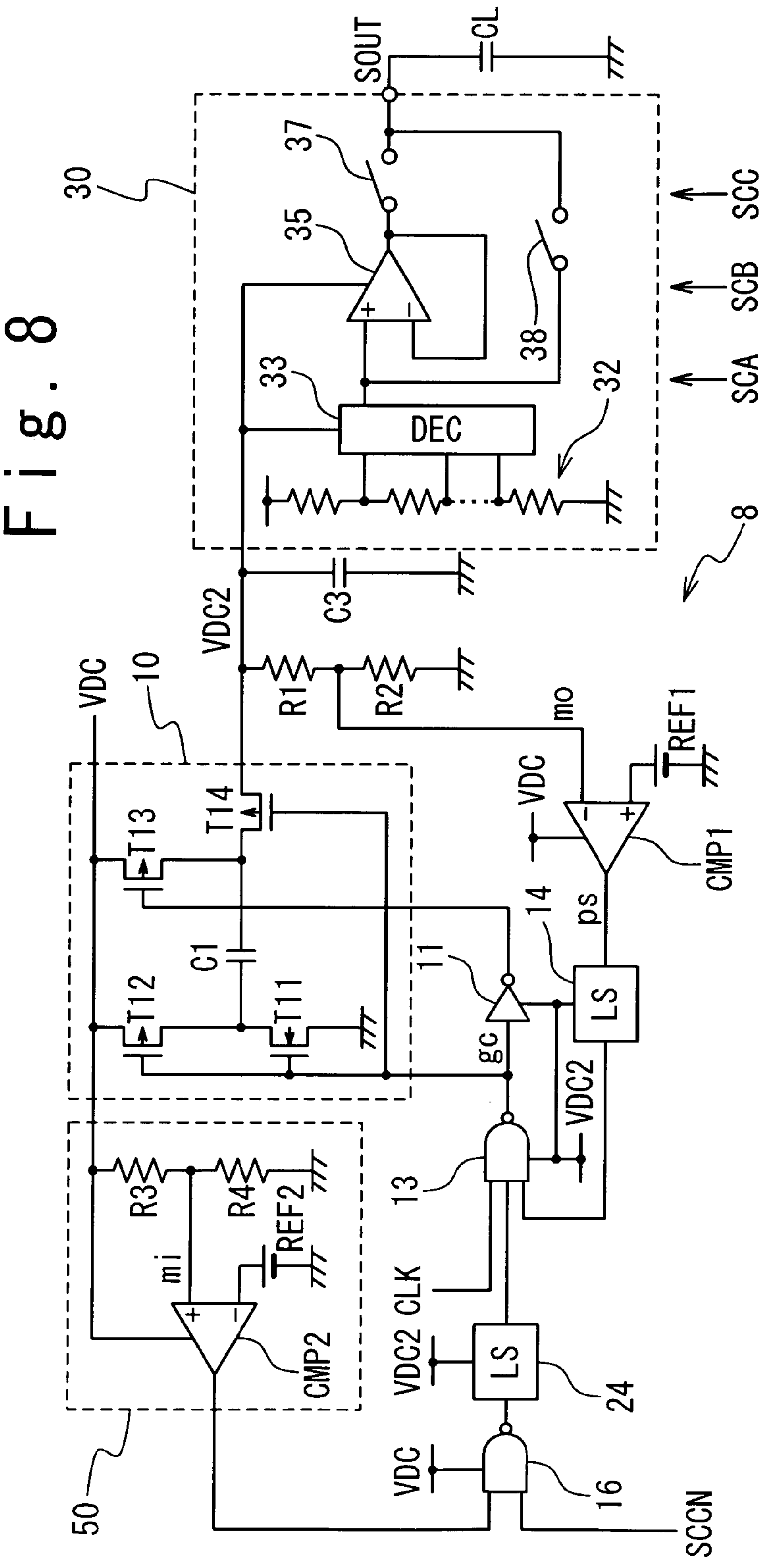
FIG. 8 is a circuit diagram illustrating an exemplary configuration of a data line driver circuit in a third embodiment of the present invention.

FIG. 8 shows a circuit diagram illustrating an exemplary configuration of a booster circuit 8 in a third embodiment. In this embodiment, the periods during which the charge pump circuit 10 is allowed to operate are restricted, when the power supply voltage VDC is increased to cause significant ripple on the output of the booster circuit 8.

Specifically, the booster circuit 8 of the third embodiment is almost similar to that of the second embodiment, except for that the booster circuit 8 incorporates a circuit for restricting the period during which the charge pump circuit 10 is allowed to operate, in place of the skip signal control circuit 40.

More specifically, the NAND circuit 16 receives the output signal of the power supply voltage monitoring circuit 50 and a control signal SCCN, which is used for setting periods during which the charge pump circuit 10 is allowed to operate. In this embodiment, the control signal SCCN is a signal obtained as the logical inversion of the control signal SCC. Therefore, the pull-up of the control signal SCCN to "H" indicates the initiation of the periods during which the source drive circuit 30 drives the liquid crystal elements CL by using the source amplifiers 35 or the decoder circuits 33. On the other hand, the pull-up of the output of the power supply voltage monitoring circuit 50 to "H" indicates the initiation of the periods during which the input monitor voltage mi exceeds the reference voltage REF2. Accordingly, the output of the NAND circuit 16 is set "H" when the input monitor voltage mi is lower than the reference voltage REF2, or when the source outputs SOUT of the source drive circuit 30 are set to high-impedance. The output signal of the NAND circuit 16 is subjected to level conversion by a level shift circuit 24 and then fed to an NAND circuit 13.

The function of the NAND circuit 13 in the third embodiment is almost same as the NAND circuit 12 in second embodiment. The NAND circuit 13 receives the level-converted output signal of the NAND circuit 16, the level-converted output signal of the comparator CMP1, and the boosting clock CLK, and generates an output signal gc for allowing the charge pump circuit 10 to perform charge and discharge operations.

A description is given next of the operation of the booster circuit 8 and the source drive circuit 30 in this embodiment.

When the input monitor voltage mi is lower than the reference voltage REF2 (i.e. when the output of the comparator CMP2 is set to "L"), the output of the NAND circuit 16 is set to "H", allowing the charge pump circuit 10 to start the boosting operation when the boosted power supply voltage VDC2 is lower than the specific voltage (i.e. when the output signal ps of the comparator CMP1 is set to "H"), in the same manner as the conventional LCD panel drivers. In this case, the operation timing of the charge pump circuit 10 is determined by the voltage level of the boosted power supply voltage VDC2 (independently of the control signal SCCN), as is the case of the conventional LCD panel driver.

Figure 9:
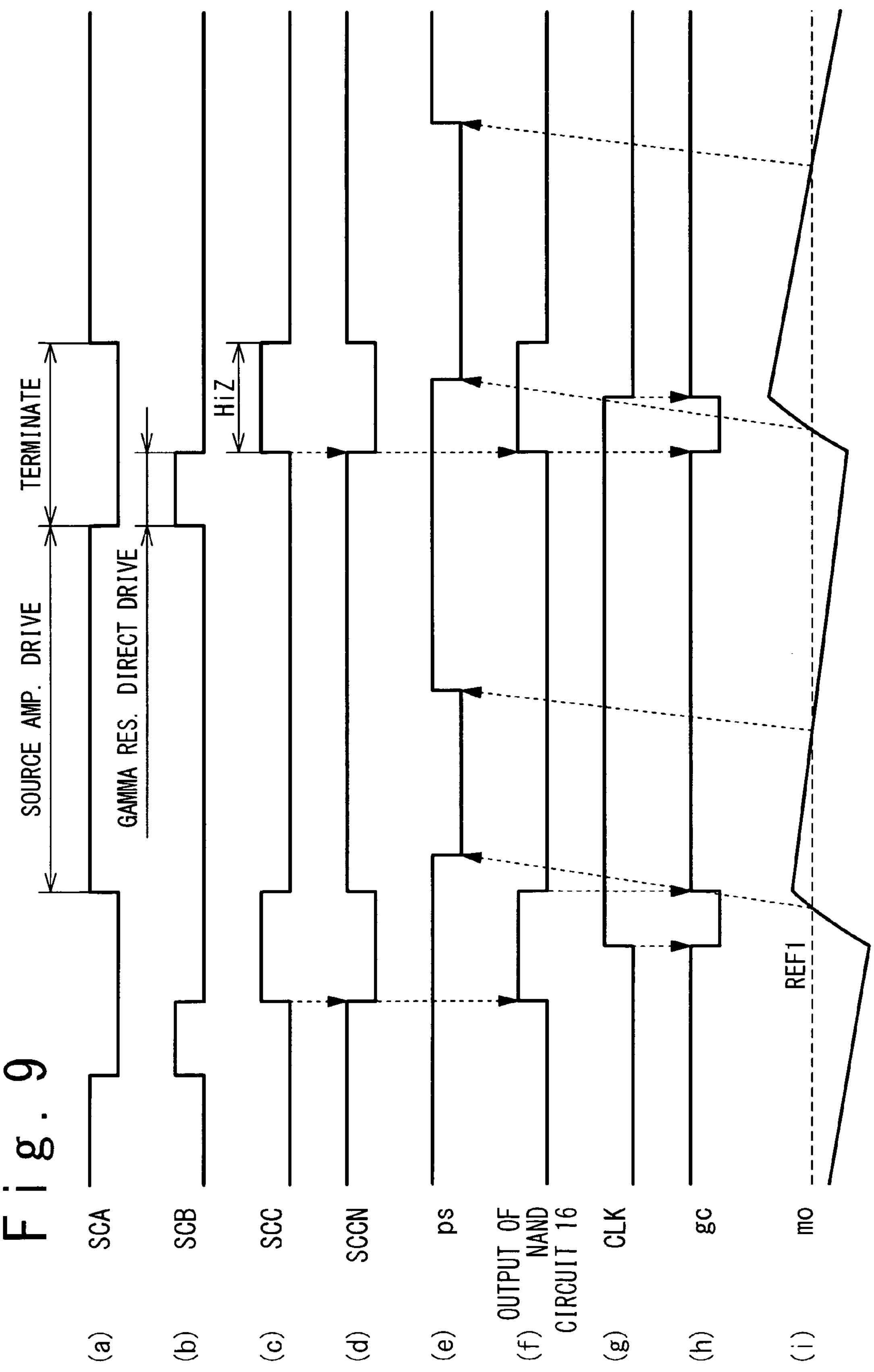
FIG. 9 is a time chart to explain an exemplary operation of the data line driver circuit in the third embodiment.

When the input monitor voltage mi exceeds the reference voltage REF2 (i.e. when the output of the comparator CMP2 in the power supply voltage monitoring circuit 50 is set to "H"), on the other hand, the charge pump circuit 10 operates in response to the control signal SCCN in addition to the voltage level of the boosted power supply voltage VDC2. FIG. 9 shows operation timings of the booster circuit 8 and the source drive circuit 30, when the input monitor voltage mi exceeds the reference voltage REF2. FIG. 9(*a*), 9(*b*), and 9(*c*) illustrate the waveforms of the control signals SCA, SCB, and SCC, and FIG. 9(*d*) illustrates the waveform of the control signal SCCN. When the control signal SCA is set to "H", the source drive circuit 30 implements the "source amplifier drive", allowing the source amplifiers 35 to drive the liquid crystal elements CL. When the control signal SCB is then set to "H", the source drive circuit 30 implements the "gamma resistor direct drive", allowing the outputs of the decoder circuits 33 to be directly connected to the liquid crystal elements CL of the LCD panel. When the control signal SCC is then set to "H", the source outputs of the source drive circuit 30 are set to high-impedance as shown in FIG. 9(*c*). It should be noted that any two of the control signals SCA, SCB, and SCC are not set to "H" at the same time. The control signal SCCN is a signal obtained by logical inversion of the control signal SCC. The cycles of the control signals SCA, SCB, SCC and SCCN may differ depending on the configuration of the LCD panel.

When the output of the power supply voltage monitoring circuit 50 is set to "H", the output of the NAND circuit 16 is set to "H" only when the source outputs SOUT of the source drive circuit 30 are set to high impedance, as shown in FIG. 9(*f*). Accordingly, the charge pump circuit 10 does not start the charge and discharging operations as FIG. 9(*h*), unless the source outputs SOUT of the source drive circuit 30 are set to high impedance (i.e. unless the control signal SCCN is set to "L"), even when the output monitor voltage mo is reduced below the reference voltage REF1 (See FIG. 9(*i*)) and the output signal ps of the comparator CMP1 is set to "H" (See FIG. 9(*e*)).

The boosting clock CLK, which is illustrated in FIG. 9(*g*), is supplied to the charge pump circuit 10 by the NAND circuit 13 only during the "high impedance periods", during which the source outputs SOUT of the source drive circuit 30 are set to high-impedance. Therefore, the output signal gc of the NAND circuit 13 allows the charge and discharge operations of the charge pump circuit 10 only during the "high impedance periods", as shown in FIG. 9 (*h*).

As thus described, the charge pump circuit 10 performs the charge and discharge operations only when the source outputs SOUT of the source drive circuit 30 are set to high impedance, in a case that the input power supply voltage VDC is high; this effectively avoids the source outputs SOUT being influenced by noise resulting from the operation of the booster circuit 8. In such operation, however, the booster circuit 8 may suffer from reduced current drive ability, when the "high impedance period", during which the source outputs SOUT of the source drive circuit 30 are set to high impedance, is excessively short. In order to avoid this, the power supply voltage monitoring circuit 50 allows the charge pump control responsive to the control signal SCCN, when the power supply voltage VDC is high enough to provide sufficient current drive ability to the booster circuit 8. When the load of the booster circuit 8 is light compared with the current drive ability of the booster circuit 8, the charge and discharge operations of the charge pump circuit 10 are implemented only when the source outputs SOUT of the source drive circuit 30 are set to high impedance, regardless of the voltage level of the power supply voltage VDC.

Fourth Embodiment

Figure 10:
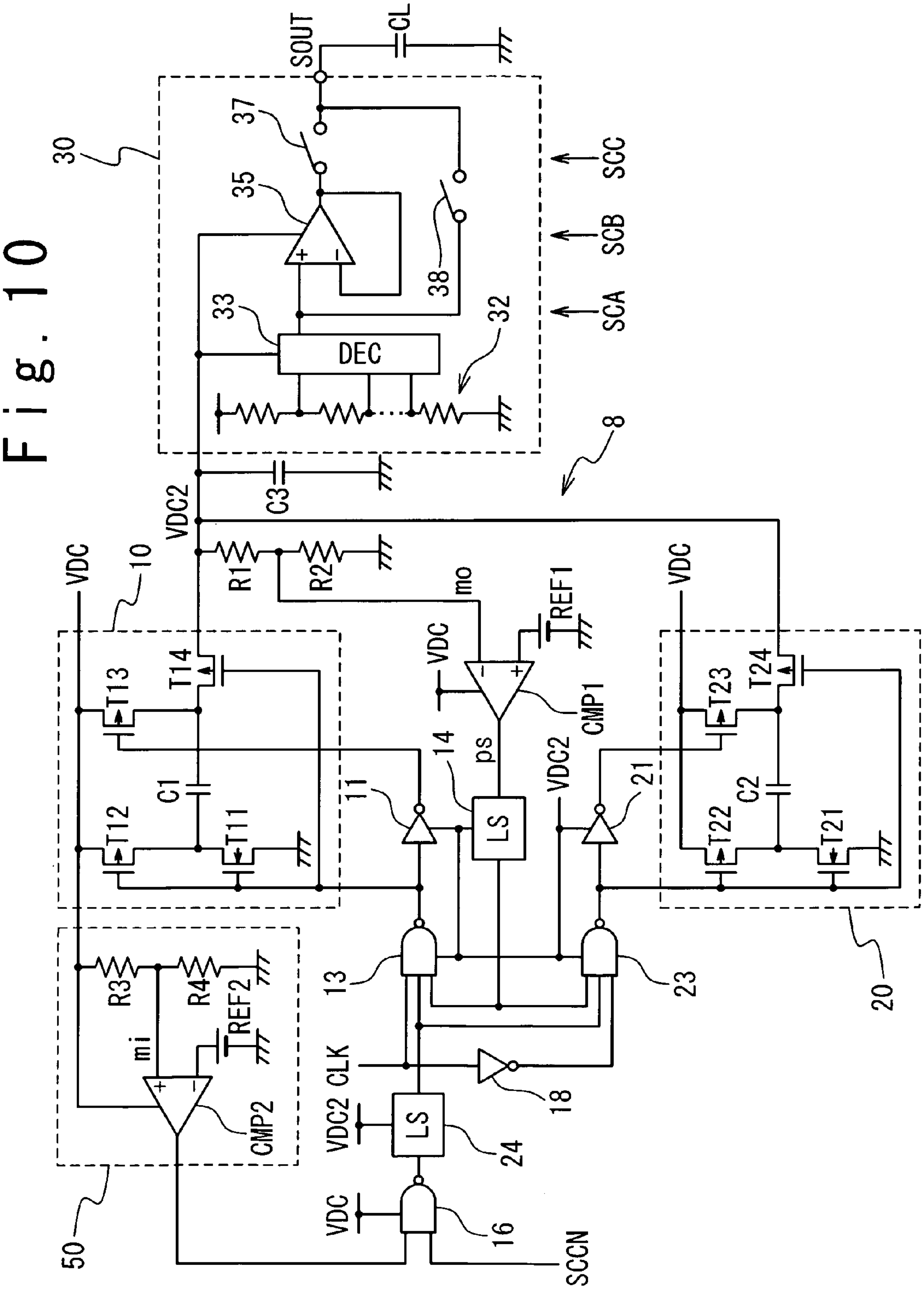
FIG. 10 is a circuit diagram illustrating an exemplary configuration of a data line driver circuit in a fourth embodiment of the present invention.

FIG. 10 shows a circuit diagram of a display panel driver according to a fourth embodiment. In the fourth embodiment, the configuration of the booster circuit 8 is almost similar to that of the third embodiment, except for that the booster circuit 8 of the fourth embodiment incorporates a pair of charge pump circuits 10 and 20 which operates on oppositely-phased boosting clocks.

The charge pump circuit 20 is provided with NMOS transistor T21, PMOS transistors T22 to T24, and a boost capacitor C2. The transistors T21 to T24 have the same functions as the transistors T11 to T14 of the charge pump circuit 10, respectively, connected in the same manner. The booster circuit 8 additionally incorporates a NOT circuit 21 and a NAND circuit 23 connected to the gates of the transistors T21 to T24 to generate signals for controlling the turn-on-and-off of the respective transistors T21 to T22. The functions of the NOT circuit 21 and the NAND circuit 23 are same as those of the NOT circuit 11 and the NAND circuit 13, respectively. The NAND circuit 23 receives the boosting clock CLK through an NOT circuit 18. Accordingly, the charge pump circuits 10 and 20 operate on the oppositely-phased clocks in boosting the power supply voltage VDC. The charge pump circuit 20 discharges the boost capacitor C2 in a period during which the charge pump circuit 10 charges the boost capacitor C1, while the charge pump circuit 10 discharges the boost circuit C1 in a period during which the charge pump circuit 20 charges the boost capacitor C2. The smoothing capacitor C3 is alternately charged by the charge pump circuits 10 and 20 and this effectively enhances the current drive ability of the booster circuit. If one charge pump circuit does not provide sufficient current drive ability for the booster circuit 8, the use of two charge pump circuits operating on oppositely-phased clock signals allows providing sufficient current drive ability. It should be noted that two-charge pump configuration may be applied to be realized in the other embodiments.

It should be noted that the booster circuit 8 in the fourth embodiment is provided with the power voltage monitoring circuit 50 for detecting that the power supply voltage VDC exceeds a fixed voltage, and the booster circuit 8 is controlled to perform boosting operations during the "high impedance periods", when the input power supply voltage VDC is high enough to cause the horizontally-striped noise. This effectively reduces noise on the output of the source drive circuit 30.

In summary, the display device of the above-described embodiments of the present invention are designed so that the booster circuit 8 starts boosting operation when the source outputs of the source drive circuit 30 are set to high-impedance. This effectively stabilizes the boosted power supply voltage VDC2 when the source drive circuit 30 implements the "source amplifier drive" or the "gamma resistor direct drive", effectively avoiding the deterioration of the image quality due to the ripple of the boosted power supply voltage VDC2 caused by the operation of the booster circuit 8. When the booster circuit 8 includes the power supply voltage monitor circuit 50, the control of the charge pump circuit 10 in response to the source outputs SOUT of the source drive circuit 30 being set to high-impedance is dependent on the power supply voltage VDC monitored by the power supply voltage monitor circuit 50; the restriction of the boosting operation of the charge pump circuit 10 into the "high-impedance periods" is validated only when the power supply voltage VDC is high enough to cause significant ripple on the source outputs SOUT of the source drive circuit 30.

It is apparent that the present invention is not limited to the above embodiments, but may be modified and changed without departing from the scope of the invention.

What is claimed is:

1. A display panel drive apparatus comprising:

a drive circuit outputting drive voltages to a display panel in response to a timing control signal used for timing control of image display on said display panel; and a booster circuit feeding a boosted power supply voltage to said drive circuit, said booster circuit including:

a charge pump circuit generating said boosted power supply voltage by boosting an input power supply voltage in response to a boosting clock;

a comparator receiving the generated boosted power supply voltage and comparing with a reference voltage to output a comparison result; and a pulse skip circuit monitoring a voltage level of said boosted power supply voltage and controlling a boosting operation of said charge pump circuit in response to said voltage level of said boosted power supply voltage, wherein said pulse skip circuit is configured to selectively allow said charge pump circuit to initiate said boosting operation in synchronization with said timing control signal including a first timing control signal for setting an impedance state of the drive circuit, wherein the pulse skip circuit comprises:

a flip-flop receiving the comparison result from the comparator at a clock input and the input power supply voltage to selectively allow said charge pump circuit to initiate said boosting operation in synchronization with said timing control signal;

a NOT circuit receiving the comparison result from the comparator; and an OR circuit outputting, an OR logical operation of an output of the NOT circuit and the timing control signal, to a reset input of the flip-flop.

2. The display panel drive apparatus according to claim 1, wherein said charge pump circuit boosts said input power supply voltage when said boosting clock is supplied to said charge pump circuit, and stops boosting said input power supply voltage when said boosting clock stops being supplied to said charge pump circuit, and wherein said pulse skip circuit controls supply of said boosting clock to said charge pump circuit.

3. The display panel drive apparatus according to claim 1, wherein said pulse skip circuit includes a skip signal control circuit configured to allow supplying said boosting clock to said charge pump circuit in response to said timing control signal, when said boosted power supply voltage is less than a predetermined output reference voltage.

4. The display panel drive apparatus according to claim 3, wherein said skip signal control circuit is configured to prohibit supplying said boosting clock to said charge pump circuit when said boosted power supply voltage exceeds said predetermined output reference voltage.

5. The display panel drive apparatus according to claim 1, further comprising:

a power supply voltage monitoring circuit monitoring said input power supply voltage, wherein said pulse skip circuit includes a skip signal control circuit configured to allow supplying said boosting clock to said charge pump circuit in response to said timing control signals when said power supply voltage monitoring circuit detects that said input power supply voltage exceeds a predetermined input reference voltage.

6. The display panel drive apparatus according to claim 5, wherein said skip signal control circuit is configured to prohibit supplying said boosting clock to said charge pump circuit when said boosted power supply voltage exceeds said predetermined output reference voltage.

7. The display panel drive apparatus according to claim 5, wherein, in a case that said input power supply voltage is less than said predetermined input reference voltage, said skip signal control circuit allows supplying said boosting clock to said charge pump circuit when said boosted power supply voltage is less than said predetermined output reference voltage and prohibits supplying said boosting clock when said boosted power supply voltage exceeds said predetermined output reference voltage.

8. The display panel drive apparatus according to claim 1, wherein said timing control signal includes a Hi-Z (high-impedance) signal in response to which outputs of said drive circuit are set to high-impedance, and wherein said pulse skip circuit supplies said boosting clock to said charge pump circuit when said outputs of said drive circuit are set to high-impedance.

9. The display panel drive apparatus according to claim 8, wherein a cycle of said boosting clock is twice as long as said timing control signal, and a rising edge or falling edge of said boosting clock is positioned in a period during which said outputs of said drive circuit are set to high-impedance.

10. The display panel drive apparatus according to claim 1, wherein said timing control signal includes a Hi-Z (high-impedance) signal in response to which outputs of said drive circuit are set to high-impedance, and wherein said pulse skip circuit supplies said boosting clock to said charge pump circuit when said boosted power supply voltage is less than a predetermined output reference voltage and said outputs of said drive circuit are set to high-impedance.

11. The display panel drive apparatus according to claim 10, further comprising:

a power supply voltage monitoring circuit monitoring said input power supply voltage, wherein, when said power supply voltage monitoring circuit detects that said input power supply voltage exceeds a predetermined input reference voltage, said pulse skip circuit supplies said boosting clock to said charge pump circuit in a period during which said boosted power supply voltage is less than said predetermined output reference voltage and said outputs of said drive circuit are set to high-impedance.

12. The display panel drive apparatus according to claim 11, wherein, in a case that said input power supply voltage is less than said predetermined input reference voltage, said pulse skip circuit supplies said boosting clock to said charge pump circuit when said boosted power supply voltage is less than said predetermined output reference voltage, stops supplying said boosting clock when said boosted power supply voltage exceeds said predetermined output reference voltage.

13. The display panel drive apparatus according to claim 1, wherein said booster circuit comprises another charge pump circuit that operates on another boosting clock having a phase opposite to said boosting clock.

14. The display panel drive apparatus according to claim 1, wherein the charge pump circuit starts the boosting operation in response to an activation of the first timing control signal to selectively operate during periods of time including high-impedance periods of the drive circuit.

15. The display panel drive apparatus according to claim 1, wherein the timing control signal comprises the first timing control signal and a clock signal from a control circuit to selectively allow the boosting operation to begin in synchronization with the timing control signal and restrict operation during time periods according to a high-impedance state of the drive circuit.

16. The display panel drive apparatus according to claim 1, wherein the pulse skip circuit further comprises a plurality of logic gates connected to the flip-flop, wherein the flip-flop with the plurality of logic gates selectively allows said charge pump circuit to initiate said boosting operation in synchronization with said timing control signal.

17. The display panel drive apparatus according to claim 1, wherein the flip-flop and a plurality of logic gates selectively enables or disables the boosting operations during periods of time according to the impedance state of the drive circuit.

18. The display panel drive apparatus according to claim 1, wherein the boosting clock is generated such that one of a rising edge and a falling edge is located in a high-impedance period.

19. The display panel drive apparatus according to claim 1, wherein the boosting clock is generated such that one of a rising edge or a falling edge of the boosting clock equally divides each of high-impedance periods into at least two periods of a same duration, the high-impedance periods being when the input power supply voltage is high enough to cause a horizontally-striped noise.

20. The display panel drive apparatus according to claim 1, wherein the timing control signal is synchronized with the first timing control signal for setting the impedance state of outputs of the drive circuit, and wherein the drive voltages are outputted from the outputs of the drive circuit to the display panel.

21. A display device comprising:

a display panel; and a display panel driver apparatus, wherein said display panel driver includes:

a drive circuit outputting drive voltages to said display panel in response to a timing control signal used for timing control of image display on said display panel; and a booster circuit feeding a boosted power supply voltage to said drive circuit, said booster circuit comprising:

a charge pump circuit generating said boosted power supply voltage by boosting an input power supply voltage in response to a boosting clock to generate;

a comparator receiving the generated boosted power supply voltage and comparing with a reference voltage to output a comparison result; and a pulse skip circuit monitoring a voltage level of said boosted power supply voltage and controlling an a boosting operation of said charge pump circuit in response to said voltage level of said boosted power supply voltage, wherein said pulse skip circuit is configured to selectively allow said charge pump circuit to initiate said boosting operation in synchronization with said timing control signal including a signal setting an impedance state of the drive circuit wherein the pulse skip circuit comprises:

a flip-flop receiving the comparison result from the comparator at a clock input and the input power supply voltage to selectively allow said charge pump circuit to initiate said boosting operation in synchronization with said timing control signal;

a NOT circuit receiving the comparison result from the comparator; and an OR circuit outputting, an OR logical operation of an output of the NOT circuit and the timing control signal, to a reset input of the flip-flop.

22. The display device according to claim 21, wherein the timing control signal is synchronized with the signal for setting the impedance state of outputs of the drive circuit, and wherein the drive voltages are outputted from the outputs of the drive circuit to the display panel.

23. A method of driving a display panel comprising:

generating a boosted power supply voltage by a charge pump circuit through boosting an input power supply voltage in response to a boosting clock;

monitoring said boosted power supply voltage by a pulse skip circuit;

controlling said boosting in response to said boosted power supply voltage that is monitored; and outputting drive voltages to a display panel in response to a timing control signal used for timing control of image display on said display panel, wherein said controlling said boosting includes selectively allowing said boosting of said input power supply voltage in response to said timing control signal including instructions of an impedance state of a drive circuit for the outputting of drive voltages to the display panel, wherein the monitoring by the pulse skip circuit comprises:

receiving, by a flip-flop, said boosted power supply voltage that is monitored at a clock input and the input power supply voltage to selectively allow said charge pump circuit to initiate said boosting operation in synchronization with the timing control signal;

receiving, by a NOT circuit, the comparison result from the comparator; and outputting, by an OR circuit, an OR logical operation of an output of the NOT circuit and the timing control signal, to a reset input of the flip-flop.

24. The method according to claim 23, wherein said controlling said boosting includes allowing a supplying of said boosting clock to said charge pump circuit in response to said timing control signal when said boosted power supply voltage is less than a predetermined output reference voltage.

25. The method according to claim 23, further comprising:
monitoring said input power supply voltage; and
allowing a supplying of said boosting clock to said charge pump circuit in response to said timing control signal when said input power supply voltage exceeds a predetermined input reference voltage.

26. The method according to claim 25, wherein, for a case that said input power supply voltage is less than said predetermined input reference voltage, supply of said boosting clock to said charge pump circuit is allowed when said output voltage is less than said predetermined output reference voltage, and is prohibited when said output voltage exceeds said predetermined output reference voltage.

27. The method according to claim 23, wherein said timing control signal includes a Hi-Z (high-impedance) signal instructing a drive circuit to set outputs thereof to high-impedance, said drive voltage being outputted through said outputs of said drive circuit, and
wherein said boosting clock is supplied to said charge pump circuit in a period during which said boosted power supply voltage is less than a predetermined output reference voltage and said outputs of said drive circuit are set to high-impedance.

28. The display panel drive apparatus according to claim 27, further comprising:
monitoring said input power supply voltage; and
supplying said boosting clock to said charge pump circuit in a period during which said boosted power supply voltage is less than a predetermined output reference voltage and said outputs of said drive circuit are set to high-impedance, when said input power supply voltage exceeds a predetermined input reference voltage.

29. The method according to claim 23, wherein the timing control signal is synchronized with the instructions for setting the impedance state of outputs of the drive circuit, and
wherein the drive voltages are outputted from the outputs of the drive circuit to the display panel.

* * * * *